Patented Aug. 10, 1926.

1,595,347

UNITED STATES PATENT OFFICE.

MINOR P. LONG, OF MODESTO, CALIFORNIA, ASSIGNOR, BY MESNE ASSIGNMENTS, TO THE LACTEIN COMPANY, OF SAN FRANCISCO, CALIFORNIA, A CORPORATION OF NEVADA.

METHOD OF PRODUCING A NONSOURING MILK FOOD.

No Drawing.    Application filed September 19, 1922.    Serial No. 589,239.

This invention relates to non-souring milk products, and the methods of making the same.

The object of my invention is to utilize whey, skimmed milk, or buttermilk, or all, and produce valuable food products therefrom.

In carrying out my process, I use sour skim, but if the same has not soured naturally, I usually hasten the souring by adding Bulgarian bacilli. I agitate this milk in a mixing vat until it becomes similar to buttermilk, and add thereto any buttermilk on hand. The whole is then thoroughly mixed together, and the lactic acid allowed to develop to about 3½% by volume, at which time I apply heat thereto very slowly, until the temperature rises to about 90 degrees Fahrenheit, at which time the whey starts to separate and precipitation begins. I then let the mass cool and stand for about twelve hours, then draw off the whey.

From this whey, I precipitate the remaining solids in solution, by the addition of very sour whey having a greater percentage of lactic acid therein, and raise the temperature of the mixture to about 180 degrees Fahrenheit quite rapidly, requiring about fifteen or twenty minutes.

The solids precipitated by this last step are then combined with those obtained by the first step and thoroughly mixed by agitation. At this stage the lactic acid content should still be about 3½%. To the mass I then add about 1/10 of 1% by volume of commercial 66 degree Baumé sulphuric acid, to cause the lactic acid to separate in the uncombined state and at which time the mixture is again thoroughly agitated for several hours, then allowed to remain quiescent for a period of ten to fifteen days, which I call "curing." The curing may be effected in the final shipping containers. Each day, during the curing, the free whey is withdrawn. If the curing is effected in barrels, the whey may be withdrawn by turning the barrels over on their sides, and letting it run out at the bung.

The final milk food product thus produced, is a whitish soft, smooth, and non-souring solid of about the consistency of lard, a wholesome and readily digested food for animals and poultry and especially good for baby chicks.

Having thus described my invention, what I desire to secure by Letters Patent is the following:

1. The method of producing a non-souring food from skimmed milk, which consists in souring the milk and agitating it, developing lactic acid to about three and one-half per cent, then gradually heating it to about ninety degrees, drawing off the whey, precipitating the remaining solids from this whey by adding sour whey thereto and heating to about one hundred and eighty degrees, adding these solids to those previously obtained and mixing them, then adding about one tenth of one per cent of commercial sulphuric acid and agitating the mass for several hours, allowing the same to cure for a number of days, and drawing off the whey from time to time.

2. The method of producing a non-souring food from skimmed milk, which consists in souring the milk, agitating it, developing lactic acid to about three and one-half per cent, and then heating to about ninety degrees, drawing off the whey, adding about one tenth of one per cent of commercial sulphuric acid, agitating for several hours, and then allowing to cure for a number of days.

In testimony whereof I affix my signature.

MINOR P. LONG.